(12) United States Patent
Hong et al.

(10) Patent No.: US 11,106,117 B2
(45) Date of Patent: Aug. 31, 2021

(54) FOLDABLE CAMERA STAND

(71) Applicant: Ipevo, Inc., Sunnyvale, CA (US)

(72) Inventors: Royce Yu-Chun Hong, Taipei (TW); Mu Hao Kao, Taipei (TW)

(73) Assignee: IPEVO, INC., Sunnyvale, CA (US)

( * ) Notice: Subject to any disclaimer, the term of this patent is extended or adjusted under 35 U.S.C. 154(b) by 40 days.

(21) Appl. No.: 16/593,697

(22) Filed: Oct. 4, 2019

(65) Prior Publication Data
US 2021/0103206 A1 Apr. 8, 2021

(51) Int. Cl.
*G03B 17/56* (2021.01)
*F16M 11/38* (2006.01)

(52) U.S. Cl.
CPC ............ *G03B 17/561* (2013.01); *F16M 11/38* (2013.01)

(58) Field of Classification Search
USPC ......................................................... 396/428
See application file for complete search history.

(56) References Cited

U.S. PATENT DOCUMENTS

| | | | | | |
|---|---|---|---|---|---|
| 3,228,283 | A | * | 1/1966 | Fulton | G03B 27/323 396/428 |
| 7,646,425 | B2 | * | 1/2010 | Bohaker | H04N 1/00562 348/373 |
| 2008/0226284 | A1 | * | 9/2008 | Coppola | G03B 17/561 396/428 |
| 2020/0387053 | A1 | * | 12/2020 | Hong | G03B 17/561 |

* cited by examiner

*Primary Examiner* — Clayton E. LaBalle
*Assistant Examiner* — Warren K Fenwick
(74) *Attorney, Agent, or Firm* — K&L Gates LLP (57) ABSTRACT

A foldable camera stand is disclosed which includes an elongated base plate, an imaging device, and an elongated first arm plate with a first end movably coupled to the base plate and a second end pivotally connected to the imaging device, the first end being opposite to the second end, wherein the imaging device and the first arm plate are approximately in the same plane which is substantially parallel to the base plate when the camera stand is in a folded state.

21 Claims, 6 Drawing Sheets

FOLDABLE CAMERA STAND

FIELD

The present disclosure relates generally to equipment assisting image taking, and, more particularly, to a foldable camera stand.

BACKGROUND

In many occasions when taking images of a document or an object on a platform, a stand is needed for mounting a camera for stability and repeatability, etc. The camera can take either still pictures or videos, and then feed the image data to a computer or a large display or both. Such a system can be used in a classroom or a conference in place of an overhead projector.

A conventional camera stand includes a base serving as the platform, a vertical rail rigidly mounted on the base, and a horizontal arm slidably attached to the vertical rail for holding a camera above the platform. The horizontal arm may swing around and slide up and down the vertical rail catering to different imaging needs. A problem with the conventional camera stand is that it is generally bulky and not easy to travel with.

As such, it is desirable to provide a camera stand that is both compact and versatile.

SUMMARY

It is an object of the present invention to provide a foldable camera stand for easy transportation yet versatile and easy to operate.

Disclosed and claimed herein is a foldable camera stand which includes an elongated base plate, an imaging device, and an elongated first arm plate with a first end movably coupled to the base plate and a second end pivotally connected to the imaging device, the first end being opposite to the second end, wherein the imaging device and the first arm plate are approximately in the same plane which is substantially parallel to the base plate when the camera stand is in a folded state.

Other aspects, features, and techniques will be apparent to one skilled in the relevant art in view of the following detailed description of the embodiments.

BRIEF DESCRIPTION OF THE DRAWINGS

The drawings accompanying and forming part of this specification are included to depict certain aspects of the present disclosure. A clearer conception of the present disclosure, and of the components and operation of systems provided with the present disclosure, will become more readily apparent by referring to the exemplary, and therefore non-limiting, embodiments illustrated in the drawings, wherein like reference numbers (if they occur in more than one view) designate the same elements. The present disclosure may be better understood by reference to one or more of these drawings in combination with the description presented herein. It should be noted that the features illustrated in the drawings are not necessarily drawn to scale.

DESCRIPTION

One aspect of the disclosure relates to a foldable camera stand. Embodiments of the present disclosure will be described hereinafter with reference to the attached drawings.

Figure 1:
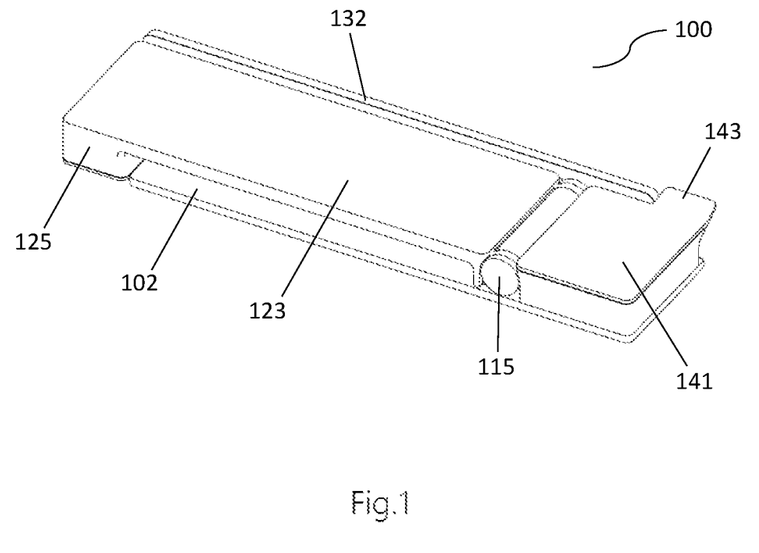
FIG. 1 is a perspective view of a foldable camera stand in a folded state according to an embodiment of the present disclosure.

FIG. 1 is a perspective view of a foldable camera stand 100 in a folded state according to an embodiment of the present disclosure. The foldable camera stand 100 includes a base plate 102, a first arm plate 132, a second arm plate 123 and a camera 141. An end of the second arm plate 123 is pivotally connected to the base plate 102 by a first hinge 115. An opposite end of the second arm plate 123 is pivotally connected to an end of the first arm plate 132 by a second hinge 125. An opposite end of the first arm plate 132 is pivotally connected to the camera 141 by a third hinge (not shown). In such folded state, the first arm plate 132, the second arm plate 123, the first hinge 115, the second hinge 125 and the camera 141 are approximately in the same plane. Referring again to FIG. 1, the camera 141 has a protruding handle 143 for lifting the foldable camera stand 100 to an extended state as well as for facilitating its rotation.

As shown in FIG. 1, a length of the first arm plate 132 is longer than the second arm plate 123, so that when in the folded state the first arm plate 132 is substantially parallel to the second arm plate 123 with the camera 141 extended beyond the first hinge 115. In an embodiment, the base plate 102 is extended beyond the hinge 115 by a predetermined amount to overlap, thus protect the camera 141. In addition, the second hinge 125 is exemplarily extended beyond an end of the base plate 102 which is away from the first hinge 115 by a distance approximately equals to the length of the second arm plate 123. As a result, the foldable camera stand 100 folds into a compact elongated box-shaped unit for easy transportation.

Figure 2:
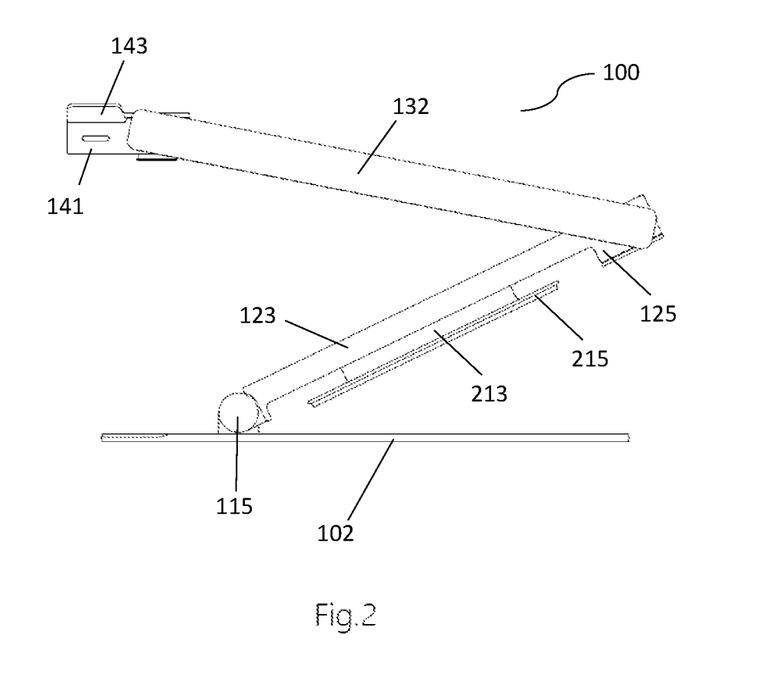
FIG. 2 is a side view of the foldable camera stand shown in FIG. 1 in a partially unfolding state.

FIG. 2 is a side view of the foldable camera stand 100 shown in FIG. 1 in a partially unfolding state. As shown in FIG. 2, the second arm plate 123 is rotated around the first hinge 115 to a first angle referencing to the base plate 102. At the same time, the first arm plate 132 is rotated around the second hinge 125 to a second angle referencing to the second arm plate 123. Values of the first and the second angle determine an overall height of the camera 141.

Referring to FIG. 2 again, the partially unfolded foldable camera stand 100 reveals a cable reel 213 on an underside of the second arm plate 123 facing the base plate 102. The cable reel 213 is capped by a cable retaining plate 215 which is extended beyond peripherals of the cable reel 213. In an embodiment, a total thickness of the second arm plate 123, the cable reel 213 and the cable retaining plate 215 is approximately the same as a width of the first arm plate 132, so that the first arm plate 132 can cover the cable reel 213 when foldable camera stand 100 is in the folded state.

Figure 3:
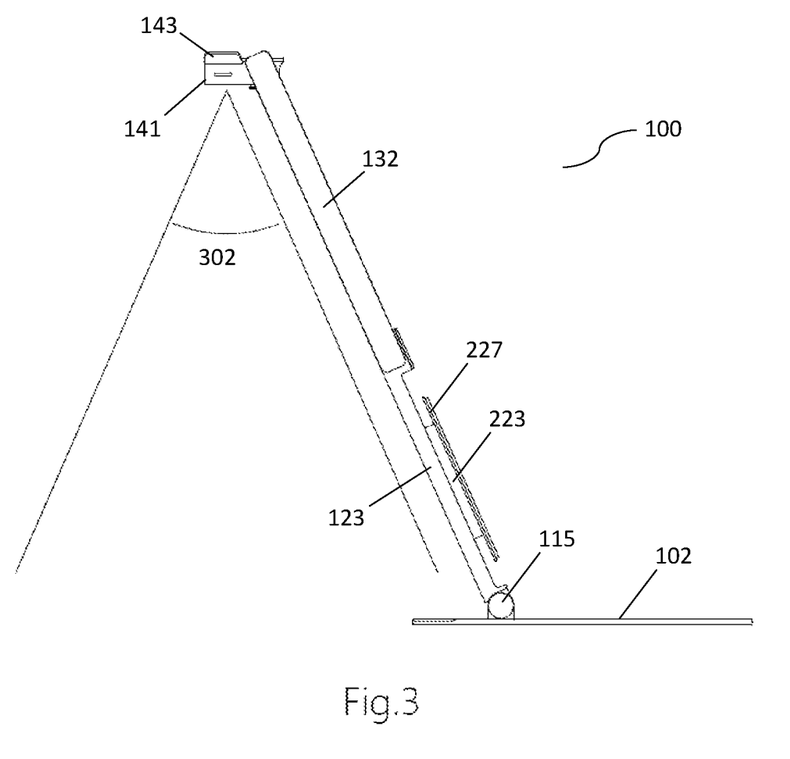
FIG. 3 is a side view of the foldable camera stand of FIG. 1 is a fully extended state.

FIG. 3 is a side view of the foldable camera stand 100 of FIG. 1 in a fully extended state in which the second arm plate 123 and the first arm plate 132 are aligned in a straight line to reach a maximum total length. The camera 141 is connected to the second end of the first arm plate 132 by a third hinge (not shown) so that the camera 141 can be rotated to a desired angle referencing to a surface (not shown) the base plate 102 rests on. When taking a picture of a book laid on the surface, the camera 141 will be rotated to be approximately parallel to the surface. As shown in FIG. 3, the camera 141 has a predetermined viewing angle 302. The second arm plate 123 is leaned at an angle so that the second arm plate 123 as well as the first hinge 115 are out of a sight of the camera 141. In embodiments, the base plate 102 is made of a heavy material, such as iron, while the second arm plate 123 and the first arm plate 132 are made of a light material such as plastic or aluminum, so that the foldable camera stand is more stable when in the fully extended state as shown in FIG. 3.

Even though the foldable camera stand 100 shown in FIGS. 1-3 employs two pivotally linked arm plates 123 and 132 for lifting the camera 141, in another embodiment, a single arm (not shown) may be used instead. A lower end of the single arm is pivotally mounted to the base plate 102 through the hinge 115, and an upper end of the single arm is pivotally connected to the camera 141. The single arm can also be folded onto the base plate 102. Although the single arm foldable camera stand is simpler to construct, it may not have as much range of extension. On the contrary, three or more scissor-like connected arms can be employed to provide greater extensions.

Figure 4:
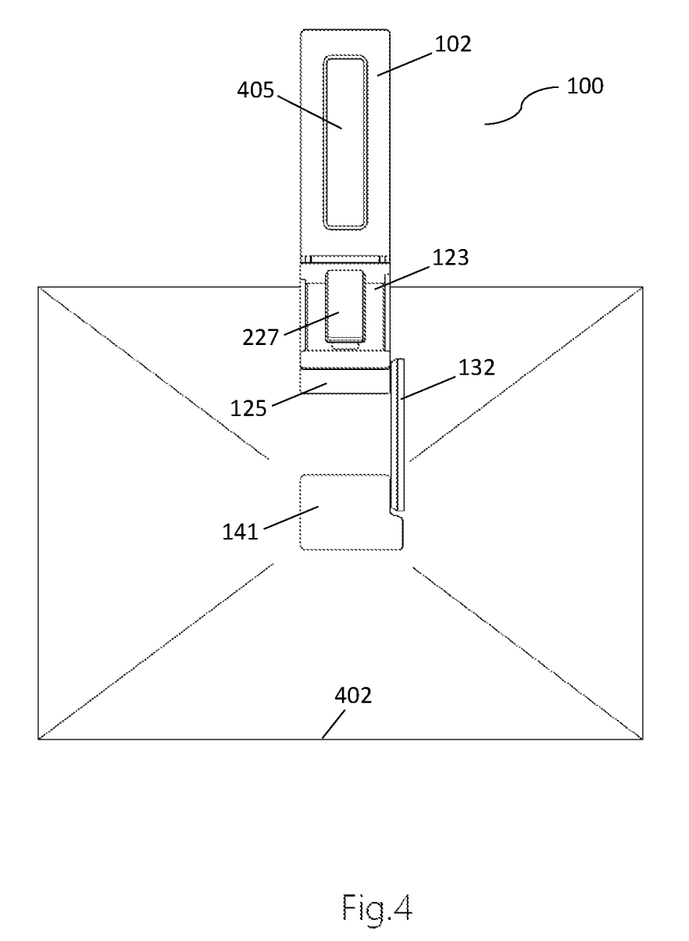
FIG. 4 is a top view of the foldable camera stand in the fully extended state shown in FIG. 3.

FIG. 4 is a top view of the foldable camera stand 100 in fully extended state shown in FIG. 3. A rectangular box 402 represents the imaging area of the camera 141. FIG. 4 also shows an opening 405 in the base plate 102, which accommodates the cable retaining plate 227 when the foldable camera stand 100 is in a folded state.

Figures 5, 6:
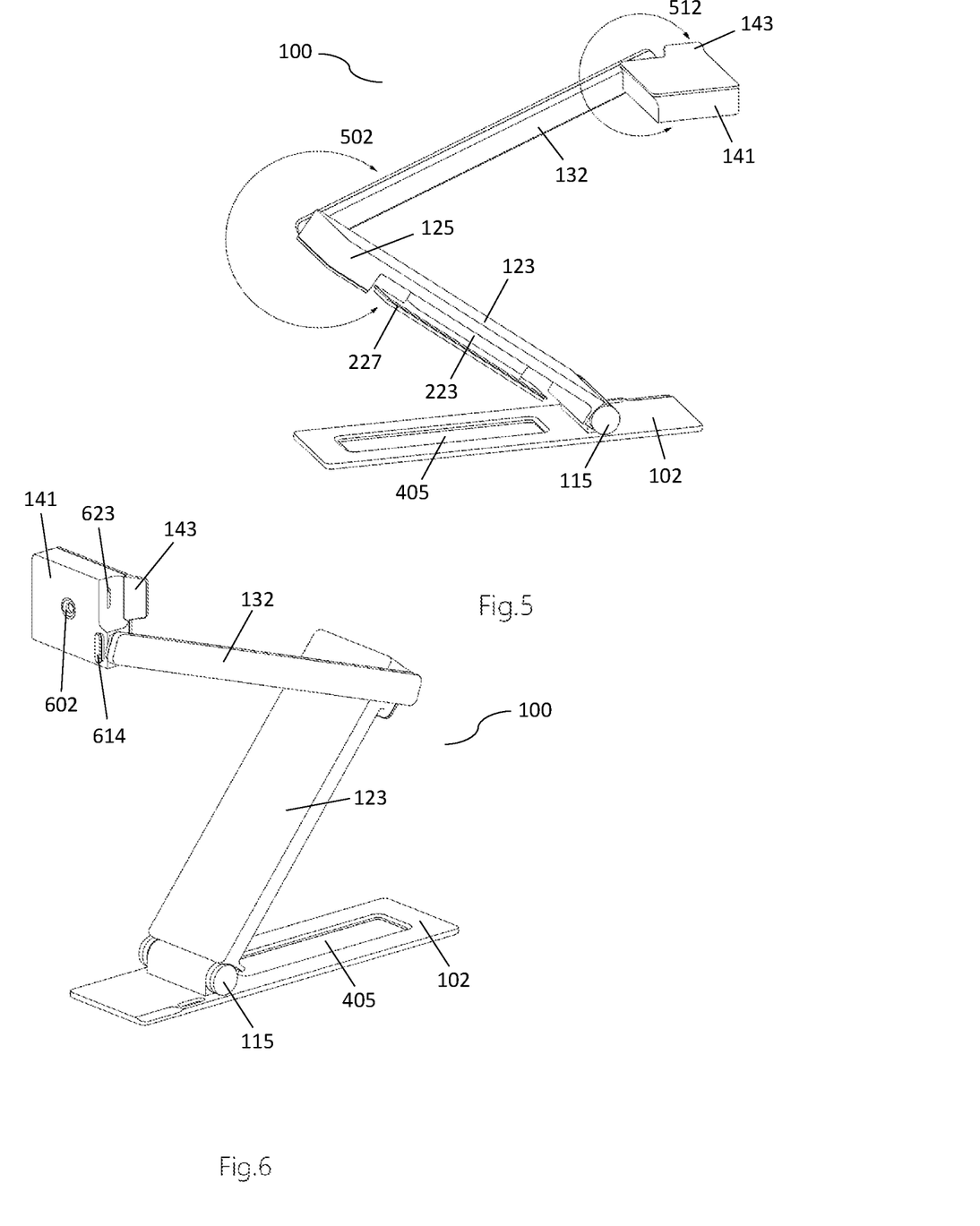
FIG. 5 is a perspective view of the foldable camera stand shown in FIG. 2.
FIG. 6 is another perspective view of the foldable camera stand shown in FIG. 2.

FIG. 5 is a perspective view of the foldable camera stand 100 shown in FIG. 2 for better depicting that the opening 405 in the base plate 102 is aligned with and can accommodate the cable retaining plate 227 when the second arm plate 123 is rotated down to the base plate 102. An angle 502 illustrates that in an embodiment the first arm plate 132 can rotate close to 360 degrees around the second hinge 125. Similarly, an angle 512 illustrates that in an embodiment the camera 141 can also rotate close to 360 degrees around the third hinge inside the camera 141. In embodiments, the first arm plate 132 is substantially perpendicular to the second arm plate 123, so that the former can be folded to a side of the latter.

FIG. 6 is another perspective view of the foldable camera stand 100 shown in FIG. 2. FIG. 6 illustrates that the camera 141 can be rotated to be perpendicular to the base plate 102. In this position, a lens 602 at a bottom of the camera 141 is facing forward. In an embodiment, the camera 141 may be equipped with a lighting device (not shown), such as a LED light or a flash light, at the bottom of the camera 141. The camera 141 is also equipped with a latching device 614 for locking an imaging part to an enclosure base of the camera 141. The latching device 614 may include a spring loaded button attached to the imaging part engaging an opening on the enclosure base. As shown in FIG. 6, the camera 141 is further equipped with a rotate button 623 that allows a user to alternate image orientation.

Although the camera 141 is depicted as permanently attached to the first arm plate 132, in other embodiments, the camera 141 may be replaced by a mounting fixture for mounting a standalone camera or a cell phone equipped with a camera. For mounting a standalone camera, the mounting fixture may include a standard camera mounting screw. For mounting a cell phone, the mounting fixture may include a clamp corresponding to certain cell phones or a magnet. In general, the camera 141 depicts an imaging device with or without a built-in lens.

Figure 7:
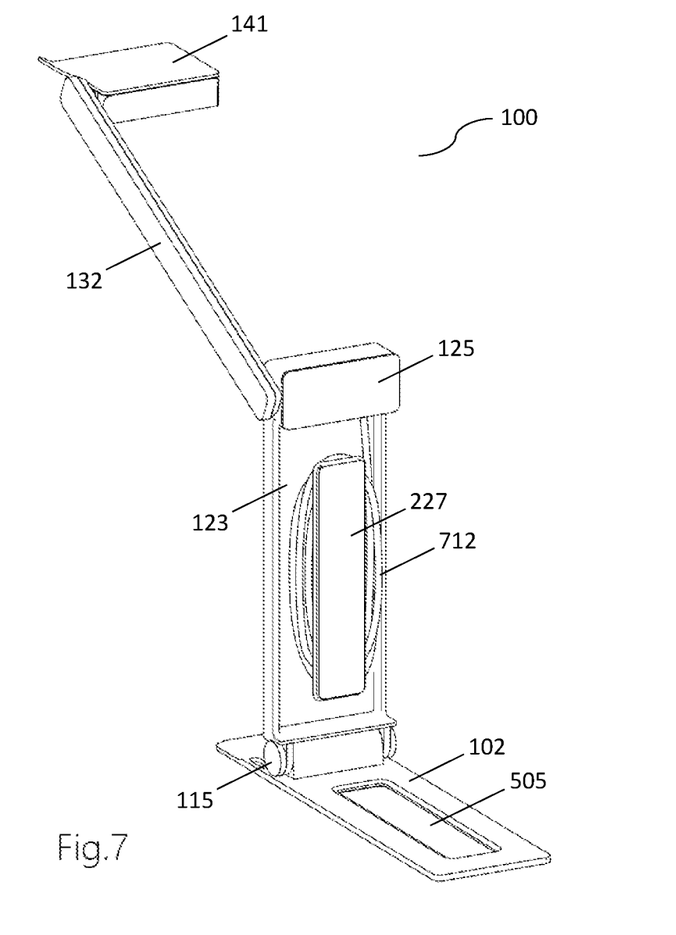
FIG. 7 illustrates a cable reel of the foldable camera stand of FIG. 2.

FIG. 7 illustrates the cable reel 223 of the foldable camera stand 100 of FIG. 2 at work. In an embodiment, the camera 141 uses a USB cable for power supply and signal transmission. Such USB cable includes two sections. A first section (not shown) is enclosed in the first arm plate 132 through the third hinge and the second hinge 125. A second section 712 comes out of the second hinge 125 and winds around the cable reel 223 and retained by the cable retaining plate 227. When the camera 141 needs to be connected to a computer, the second section 712 of the USB cable can be unwound to reach the computer.

Figure 8:
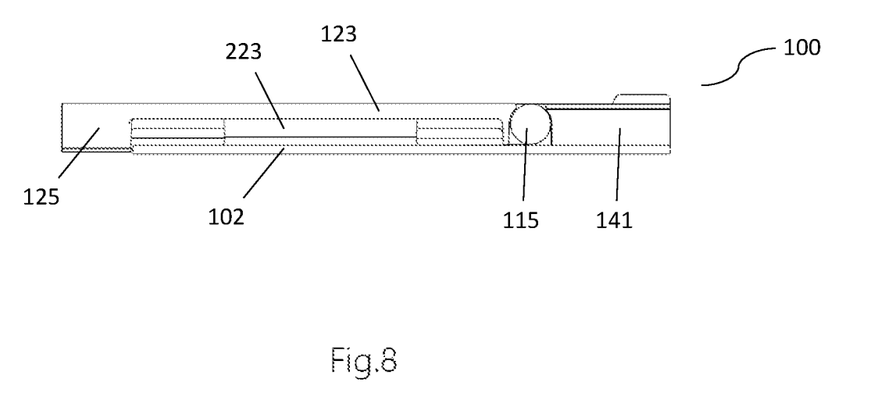
FIG. 8 is a side view of the foldable camera stand of FIG. 1 in a folded state.

FIG. 8 is a side view of the foldable camera stand 100 of FIG. 1 in a folded state. The camera 141 has a box-like enclosure which has approximately the same height as that of the first hinge 115 or the second arm plate 123, so that in the folded state, the foldable camera stand 100 resembles an elongated box for easy traveling with.

Figure 9:
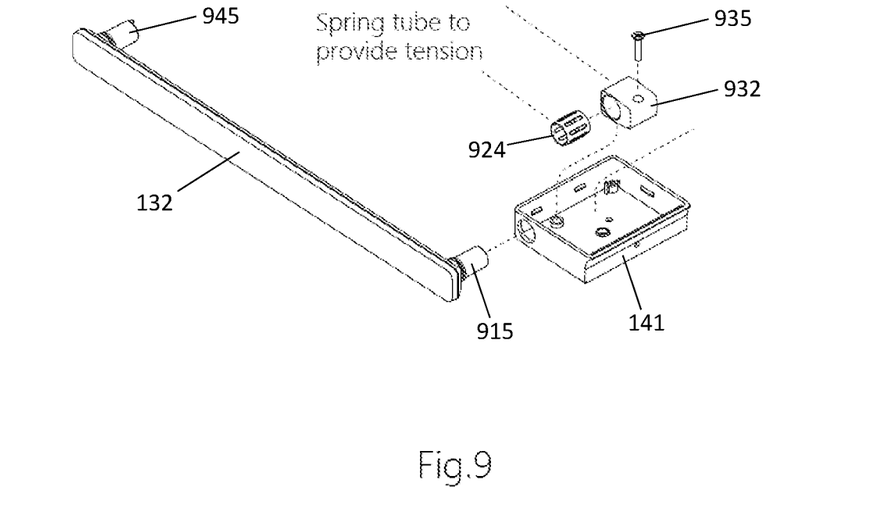
FIG. 9 illustrates exemplary internal components of a hinge used in the foldable camera stand.

FIG. 9 illustrates exemplary internal components of the third hinge used for pivotally connecting the first arm plate 132 and the camera 141. The third hinge includes a shaft 915, a spring tube 924 and a sleeve 932. The shaft 915 is mounted on the second end of the first arm plate 132, and in operation is inserted in the spring tube 924. The spring tube 924 is then inserted in the sleeve 932 which is fastened to the enclosure of the camera 141 by a screw 935. The spring tube 924 provides a certain amount resistance to the rotation of the sleeve 932 around the shaft 915, so that the camera 141 can remain stable relative to the first arm plate 132 when there is no external force applied thereto. On the other hand, an operator can overcome the resistance and force the camera 141 to rotate.

In embodiments, the first hinge 115 and the second hinge 125 may also employ the hinge mechanism shown in FIG. 9, which also shows a shaft 945 mounted to the first end of the first arm plate 132 for engaging the second hinge 125 (not shown in FIG. 9).

Figure 10:
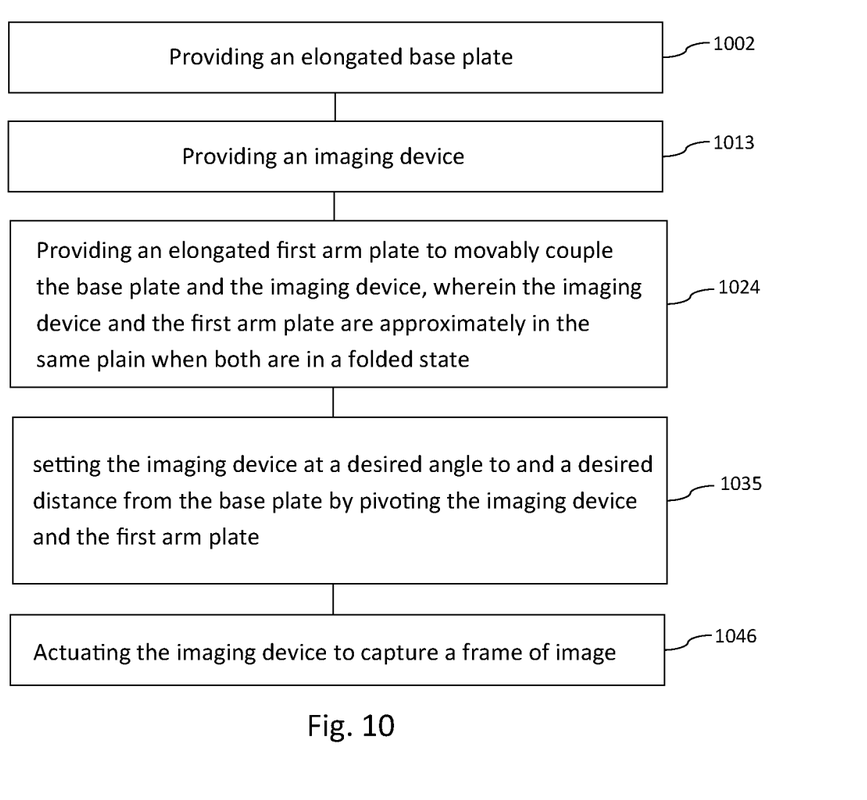
FIG. 10 is a flow-chart illustrating the foldable camera stand of FIG. 1 in operation.

FIG. 10 is a flow-chart illustrating the foldable camera stand 100 of FIG. 1 in operation. In step 1002, an elongated base plate is provided. In step 1013, an imaging device is provided. In step 1024, an elongated first arm plate is provided which has a first end movably coupled to the base plate and a second end pivotally connected to the imaging device, the first end being opposite to the second end, wherein the imaging device and the first arm plate are approximately in the same plane which is substantially parallel to the base plate when the imaging device and the first arm plate are in a folded state. In step 1035, setting the imaging device at a desired angle to and a desired distance from the base plate by pivoting the imaging device and the first arm plate. In step 1046, actuating the imaging device to capture a frame of image.

While this disclosure has been particularly shown and described with references to exemplary embodiments thereof, it shall be understood by those skilled in the art that various changes in form and details may be made therein without departing from the spirit of the claimed embodiments.

What is claimed is:

1. A camera stand comprising:
an elongated base plate;
an imaging device; and
an elongated first arm plate with a first end movably coupled to the base plate and a second end pivotally connected to the imaging device, the first end being opposite to the second end,
wherein the imaging device and the first arm plate are approximately in a same plane which is substantially parallel to the base plate when the camera stand is in a folded state.

2. The camera stand of claim 1, wherein the base plate overlaps the imaging device in the folded state.

3. The camera stand of claim 1, wherein the imaging device includes a camera lens.

4. The camera stand of claim 1, wherein the imaging device includes a lighting device.

5. The camera stand of claim 1, wherein the imaging device includes a standard camera mounting fixture.

6. The camera stand of claim 1, wherein the imaging device includes a cell phone mounting device.

7. The camera stand of claim 1, further comprising an elongated second arm plate having a third end and a fourth end opposite to each other, the third end being pivotally connected to the base plate and the fourth end being pivotally connected to the first end of the first arm plate.

8. The camera stand of claim 7, further comprising a first hinge for the pivotal connection between the third end of the second arm plate and the base plate.

9. The camera stand of claim 7, further comprising a second hinge for the pivotal connection between the fourth end of the second arm plate and the first end of the first arm plate.

10. The camera stand of claim 7, wherein in the folded state a first hinge, a second hinge, and the second arm plate are approximately in the same plane where the first arm plate and the imaging device are in.

11. The camera stand of claim 7, wherein the second arm plate is substantially perpendicular to the first arm plate.

12. The camera stand of claim 11, wherein the first arm plate can be rotated to a side of the second arm plate.

13. The camera stand of claim 7, further comprising a cable reel protruding from a side of the second arm plate facing the base plate.

14. The camera stand of claim 13, further comprising a cable retaining plate capping the cable reel and extended beyond a peripheral of the cable reel.

15. The camera stand of claim 14, wherein the base plate has an opening accommodating the cable retaining plate when the camera stand is in the folded state.

16. The camera stand of claim 1, wherein the first arm plate has a concave space for accommodating a USB cable.

17. The camera stand of claim 1, wherein the imaging device include a third hinge for the pivotal connection between the imaging device and second end of the first arm plate.

18. The camera stand of claim 17, wherein the third hinge includes a spring tube for providing resistance to rotation of a sleeve around a shaft.

19. The camera stand of claim 18, wherein the shaft is mounted to the second end of the first arm plate while the sleeve is mounted to the imaging device.

20. A camera stand comprising:
an elongated base plate;
an imaging device;
an elongated first arm plate having a first end and a second end opposite to each other; and
an elongated second arm plate having a third end and a fourth end opposite to each other,
wherein the first end of the first arm plate is pivotally connected to the fourth end of the second arm plate, the second end of the first arm plate is pivotally connected to the imaging device, and the third end of the second arm plate is pivotally connected to the base plate, and
wherein the imaging device, the first arm plate, and the second arm plate are approximately in a same plane which is substantially parallel to the base plate when the camera stand is in a folded state.

21. A image taking method comprising:
providing an elongated base plate;
providing an imaging device;
providing an elongated first arm plate with a first end movably coupled to the base plate and a second end pivotally connected to the imaging device, the first end being opposite to the second end, wherein the imaging device and the first arm plate are approximately in a same plane which is substantially parallel to the base plate when the imaging device and the first arm plate are in a folded state;
setting the imaging device at a desired angle to and a desired distance from the base plate by pivoting the imaging device and the first arm plate; and
actuating the imaging device to capture a frame of image.

* * * * *

UNITED STATES PATENT AND TRADEMARK OFFICE
CERTIFICATE OF CORRECTION

| | | |
|---|---|---|
| PATENT NO. | : 11,106,117 B2 | |
| APPLICATION NO. | : 16/593697 | |
| DATED | : August 31, 2021 | |
| INVENTOR(S) | : Royce Yu-Chun Hong and Mu Hau Kao | |

It is certified that error appears in the above-identified patent and that said Letters Patent is hereby corrected as shown below:

On the Title Page

Item (72), Line 2, reading "Mu Hao Kao" should be changed to --Mu Hau Kao--.

Signed and Sealed this
Seventh Day of February, 2023

Katherine Kelly Vidal
*Director of the United States Patent and Trademark Office*